(12) United States Patent
Li et al.

(10) Patent No.: US 10,884,768 B2
(45) Date of Patent: Jan. 5, 2021

(54) SOLUTION WHICH CAN IMPROVE VDI USER EXPERIENCE AUTOMATICALLY

(71) Applicant: VMware, Inc., Palo Alto, CA (US)

(72) Inventors: Binyang Li, Beijing (CN); Zhikai Chen, Beijing (CN); Yao Zhang, Beijing (CN); Ming Chen, Beijing (CN); Wenping Fan, Beijing (CN); Sandro Moiron, Redmond, WA (US); Kiran Rao, Cupertino, CA (US)

(73) Assignee: VMWARE, INC., Palo Alto, CA (US)

( * ) Notice: Subject to any disclaimer, the term of this patent is extended or adjusted under 35 U.S.C. 154(b) by 94 days.

(21) Appl. No.: 16/354,201

(22) Filed: Mar. 15, 2019

(65) Prior Publication Data
US 2020/0241894 A1 Jul. 30, 2020

(30) Foreign Application Priority Data
Jan. 25, 2019 (WO) ................ PCT/CN2019/073146

(51) Int. Cl.
*G06F 9/455* (2018.01)
*G06F 9/451* (2018.01)
*G06N 20/00* (2019.01)
*G06N 20/20* (2019.01)

(52) U.S. Cl.
CPC .......... *G06F 9/452* (2018.02); *G06F 9/45558* (2013.01); *G06N 20/00* (2019.01); *G06F 2009/45595* (2013.01); *G06N 20/20* (2019.01)

(58) Field of Classification Search
CPC ................. G06F 9/452; G06F 9/45558; G06F 2009/45595; G06N 20/00; G06N 20/20
See application file for complete search history.

(56) References Cited

U.S. PATENT DOCUMENTS

| | | | | |
|---|---|---|---|---|
| 10,320,813 | B1* | 6/2019 | Ahmed | ................ H04L 63/1441 |
| 2017/0185437 | A1* | 6/2017 | Thomas | .............. G06F 9/45558 |
| 2019/0213027 | A1* | 7/2019 | Bhandari | ................ G06F 9/452 |

OTHER PUBLICATIONS

"Horizon 7 Architecture Planning", VMware Horizon 7 7.6, Sep. 6, 2018, VMware, Inc.
"VMware Blast Policy Settings", VMware Horizon 7 7.0, Last Updated Mar. 1, 2017, VMware, Inc.

* cited by examiner

*Primary Examiner* — Adam Lee
(74) *Attorney, Agent, or Firm* — SU IP Consutling

(57) ABSTRACT

A method to improve virtual desktop infrastructure (VDI) user experience includes providing a user access to a first virtual desktop executing a first set of applications and having a first virtual machine (VM) configuration, collecting VDI performance metrics associated with the first virtual desktop, detecting a problem from the VDI performance metrics, and changing a first remote display protocol configuration to address the problem. The method further includes collecting the user's feedback, training a model with the first VM configuration, the first set of applications, the user's feedback, and the first remote display protocol configuration, receiving a second VM configuration for a second virtual machine providing a second virtual desktop and a second set of applications on the second virtual desktop, using the model to generate a second remote display protocol configuration for the second virtual desktop, and configuring the second virtual desktop with the second remote display protocol configuration.

24 Claims, 6 Drawing Sheets

SOLUTION WHICH CAN IMPROVE VDI USER EXPERIENCE AUTOMATICALLY

CROSS-REFERENCE TO RELATED APPLICATION

The present application Ser. No. 16/354,201 claims the benefit of Patent Cooperation Treaty (PCT) Application No. PCT/CN2019/073146, filed Jan. 25, 2019, which is incorporated herein by reference.

BACKGROUND

Virtual desktop infrastructure (VDI) is a desktop virtualization approach where a virtual (remote) desktop is implemented with a virtual machine running on a server in a data center. An endpoint device accesses the virtual desktop over a private or public network to allow a user to interact with the operating system (OS) and its applications as if they were running locally. The endpoint device may be a traditional PC, thin client, or even a mobile device such as a smart phone or a tablet.

VDI providers constantly seek to improve the virtual desktop user experience. The user experience is usually impacted by several factors, including network latency, image quality, central processing unit (CPU) speed, and policy configuration.

DETAILED DESCRIPTION

Figure 1:
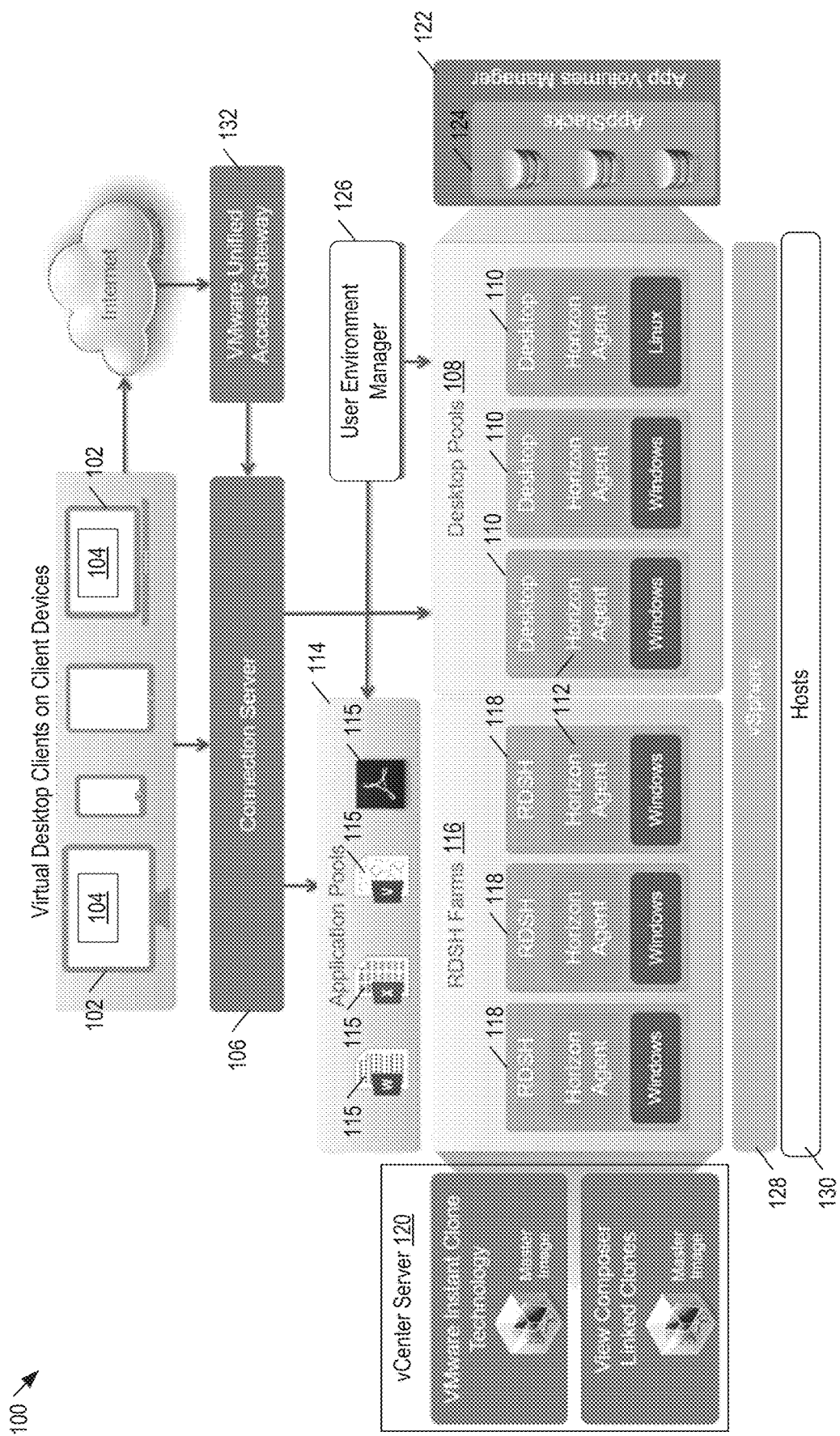
FIG. 1 is a block diagram illustrating the logical architecture of a virtual desktop infrastructure (VDI) system in examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

An enterprise virtual desktop infrastructure (VDI) suite, such as VMware Horizon Enterprise, may provide a bundle of policy settings for remote display protocol that are used to improve the virtual desktop user experience according to factors including network latency, image quality, central processing unit (CPU) speed, and operating system (OS) policy configuration such as power management, firewall policy, and access policy. Table 1 lists some of the settings that can impact the VDI user experience. However, conventionally these settings are static as they do not change during a VDI session.

TABLE 1

| Setting Name | Setting Description |
| --- | --- |
| H264maxQP | Specifies the image quality for the remote display configured to use H.264 encoding. The minimum and maximum quantization values that determine how much an image is controlled for lossless compression can be specified. A minimum quantization value for the best image quality can be specified. A maximum quantization value for the lowest image quality can be specified. |
| MaxBandwidthKbpsPerMegaPixelSlope | Specifies the maximum bandwidth slope, in kilobits per second (kbps), that is reserved for a VDI session. |
| MaxFrameRate | Specifies the maximum rate of screen updates. Use this setting to manage the average bandwidth that users consume |
| MaxSessionBandwidth | Specifies the maximum bandwidth, in kilobits per second (kbps), for a VDI session. The bandwidth includes all imaging, audio, virtual channel, USB, and VDI control traffic. The default is 1 Gbps. |

In examples of the present disclosure, a tool is provided to automatically and dynamically adjust one or more of these settings in order to improve the user experience for a VDI product. The tool will collect performance metrics to detect any problem with a VDI session. The tool may detect the user is experiencing low frame per second (FPS) of screen updates and automatically increase the maximum allowed bandwidth for frame transfer or reduce the image quality of screen updates. The tool may detect the user is experiencing low image quality and automatically increase the maximum allowed bandwidth or increase the image quality of screen updates. The tool helps not only to improve the user experience but also report feedbacks from the users to an administrator as well as the VDI provider. A machine leaning method analyzes the user feedbacks to build a model that can predict a VDI configuration that provides a good user experience for a given virtual machine configuration for a virtual desktop and applications running on the virtual desktop.

FIG. 1 is a block diagram illustrating the logical architecture of a DVI system 100 in examples of the present disclosure. System 100 may be a software-defined data center running VMware Horizon Enterprise. System 100 includes client devices 102 installed with virtual desktop clients 104 (for clarity less than all are labeled), a connection server 106, virtual desktop pools 108 each consisting of virtual desktops 110 installed with virtual desktop agents 112, application pools 114 implemented with RDSH farms 116 each consisting of remote desktop session host (RDSH) servers 118 installed with virtual desktop agents 112 (for clarity less than all are labeled), a management server 120 with instant clone and linked clone technologies, an application volumes manager 122 with application stacks 124, a user environment manager 126, and virtualization software 128 running on host computers 130 that implement desktop pools 108 and RDSH farms 116.

End users open virtual desktop clients 104 to display their virtual desktops 110 and applications from application pools 114. Virtual desktop clients 104 can be installed on a variety of client devices 102 such as laptops, personal computers (PCs), thin client devices, tablets, and smartphones.

Connection server 106 acts as a broker for client connections. Connection server 106 authenticates a user through Windows Active Directory and directs the request to the appropriate virtual desktops 110 or RDSH servers 118. Connection server 106 provides an administrative console for configuring and monitoring virtual desktops 110 and RDSH servers 118. Connection server 106 also runs an engine for creating instant clones of virtual desktops 110 and RDSH servers 118. Virtual desktops 110 may run a variety of guest OS, such as Windows and Linux while RDSH servers 118 run Windows.

Virtual desktop agents 112 are installed on virtual desktop 110 and RDSH servers 118. A virtual desktop agent 108 communicates with a virtual desktop client 104 to access a virtual desktop 110 in a desktop pool 108 or published applications 115 hosted on a RDSH farm 116. Virtual desktop agent 108 and virtual desktop client 104 communicate through a remote display protocol, such as VMware Blast, PC over IP (PCoIP), or Microsoft Remote Desktop Protocol.

A virtual machine can be installed with virtual desktop agent 112 and cloned to create a number of virtual desktops 110 in a virtual desktop pool 108 or a number of RDSH servers 118 in a RDSH farm 116. Cloning may be performed using either the instant cloning or linked clone technology provided by management server 120.

An application pool 114 defines published applications 115 hosted by a RDSH farm 116 as well as user and group entitlements to the applications. Application volumes manager 124 can be used to deliver applications to virtual desktops 110 in a desktop pool 108 or RDSH servers 118 in a RDSH farm 116.

User environment manager 126 can be used to manage user profile and policy settings for each user's virtual desktop 110 or published applications 115 to provide a consistent user experience across different client devices 102.

System 100 optionally includes a unified access gateway 132 that provides secure external access to virtual desktops 110 and published applications 115.

Figure 2:
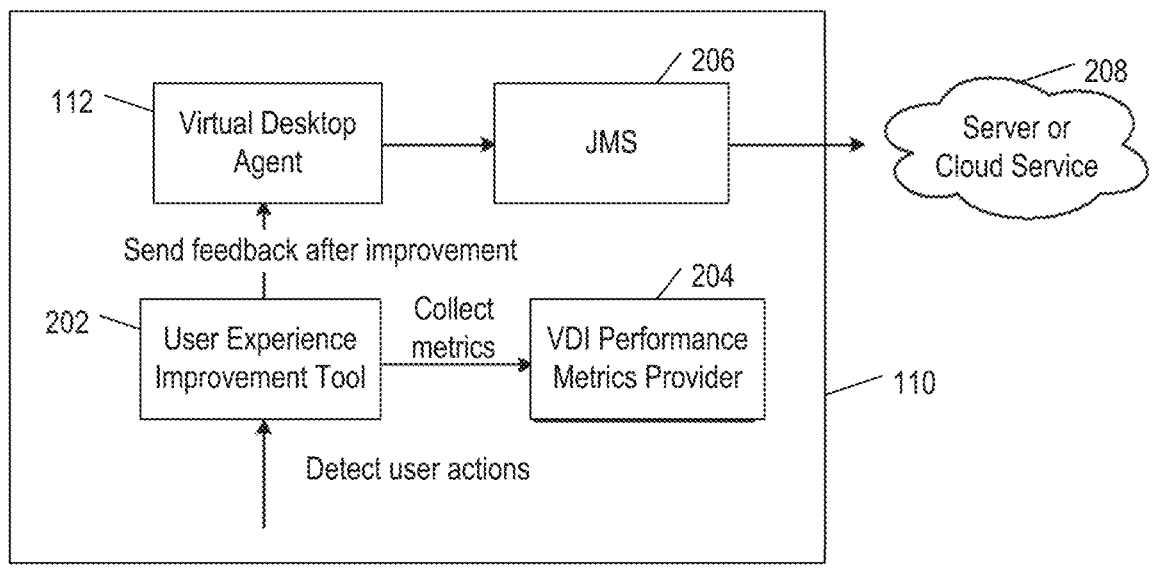
FIG. 2 is a block diagram illustrating the interaction between a user experience improvement tool and other VDI components in some examples of the present disclosure.

In examples of the present disclosure, each virtual desktop 110 further includes a user experience improvement tool 202 and a VDI performance metrics provider 204, which may be installed along with virtual desktop agent 112 on the virtual desktop. FIG. 2 is a block diagram illustrating the interaction between the user experience improvement tool 202 and other VDI components in some examples of the present disclosure. When a user of virtual desktop 110 feels her user experience is poor, she may trigger the user experience improvement tool 202 (e.g., clicking a button to launch the tool from virtual desktop client 104 in FIG. 1). In response, the user experience improvement tool 202 collects the current performance metrics from the VDI performance metrics provider 204 and attempts to improve the user experience by modifying policy settings of the remote display protocol (i.e., modify the remote display protocol configuration) for virtual desktop 110 based on the collected metrics. After modifying the remote display protocol configuration, the user experience improvement tool 202 collects a feedback from the user and sends the feedback to virtual desktop agent 112, which sends the user feedback via Java message service (JMS) 206 through connection server 106 (FIG. 1) and then a cloud connector (not shown) to an artificial intelligence (AI) server or cloud service 208. Based on a number of user feedbacks, AI server or cloud service 208 trains a model that can recommend a remote display protocol configuration for a given combinations of virtual machine configuration and applications on a new or existing virtual desktop group 108 (FIG. 1).

Figure 3:
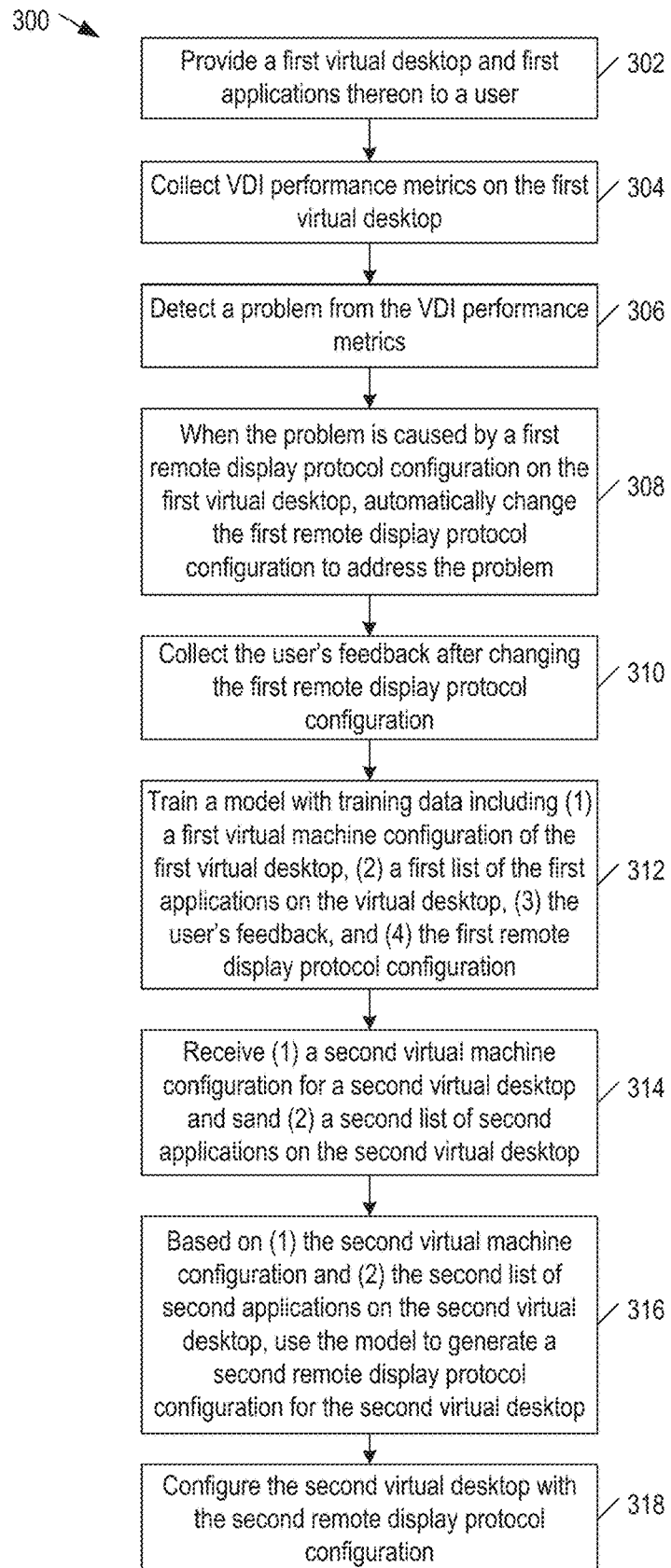
FIG. 3 is a block diagram illustrating a method for the system of FIG. 1 to improve user experience in some examples of the present disclosure.

FIG. 3 is a block diagram illustrating a method 300 for system 100 (FIG. 1) to improve user experience in some examples of the present disclosure. Method 300, and any method described herein, may be implemented as instructions encoded on a computer-readable medium that is to be executed by a processor in a computer system. Method 300, and any method described herein, may include one or more operations, functions, or actions illustrated by one or more blocks. Although the blocks are illustrated in sequential orders, these blocks may also be performed in parallel, and/or in a different order than those described herein. In addition, the various blocks may be combined into fewer blocks, divided into additional blocks, and/or eliminated based upon the desired implementation. Method 300 may begin in block 302.

In block 302, a first virtual desktop 110 (FIG. 1) and first applications thereon are provided to a user on a client device 102 (FIG. 1). More specifically, a virtual desktop client 104 (FIG. 1) on client device 102 connects with a virtual desktop agent 112 (FIG. 1) on first virtual desktop 110, and the virtual desktop client and agent begin to communicate through a remote display protocol. First virtual desktop 110 is from a first desktop pool 108 (FIG. 1) assigned to the user, and the first applications are from an application stack 124 (FIG. 1) assigned to the desktop pool. Block 302 may be followed by block 304.

In block 304, in response to the user complaining of a poor user experience, the user experience improvement tool 202 (FIG. 2) in first virtual desktop 110 collects the current VDI performance metrics on the first virtual desktop, which are provided by the VDI performance metrics provider 204

(FIG. 2) on the first virtual desktop for a VDI session. Block 304 may be followed by block 306.

In block 306, the user experience improvement tool 202 detects a problem from the VDI performance metrics. Block 306 may be followed by block 308.

In block 308, when the problem is caused by a first remote display protocol configuration on first virtual desktop 110, the user experience improvement tool 202 automatically changes the first remote display protocol configuration to address the problem. Block 308 may be followed by block 310.

In block 310, the user experience improvement tool 202 collects the user's feedback after changing the first remote display protocol configuration for the VDI session. Block 310 may be followed by block 312.

In block 312, the user experience improvement tool 202 sends the user's feedback through virtual desktop agent 112 to AI server or cloud service 208 (FIG. 2). AI server or cloud service 208 trains a model with training data from the user's VDI session including (1) a first virtual machine configuration of first virtual desktop 110, (2) a first list of the first applications on the virtual desktop, (3) the user's feedback, and (4) the first remote display protocol configuration, as well as training data from other VDI sessions. Block 312 may be followed by block 314.

In block 314, AI server or cloud service 208 receives from connection server 106 (FIG. 1) a request for a second remote display protocol configuration for a second virtual desktop 110 having (1) a second virtual machine configuration and (2) a second list of second applications. For example, second virtual desktop 110 is part of a second desktop pool 108 and AI server or cloud service 208 receives the request for the second desktop pool having (1) the second virtual machine configuration and (2) the second list of second applications. Block 314 may be followed by block 316.

In block 316, based on (1) the second virtual machine configuration and (2) the second list of second applications on the second virtual desktop 110, AI server or cloud service 208 uses the model to generate the second remote display protocol configuration for second virtual desktop 110. For example, AI server or cloud service 208 generates the second remote display protocol configuration for the second desktop pool 108, including the second virtual desktop 110. AI server or cloud service 208 may provide the second remote display protocol configuration back to connections server 106. Block 316 may be followed by block 318.

In block 318, connection server 106 configures second virtual desktop 110 with the second remote display protocol configuration. For example, connection server 106 configures the second virtual desktop pool 108, including the second virtual desktop 110, with the second remote display protocol configuration.

Figure 4:
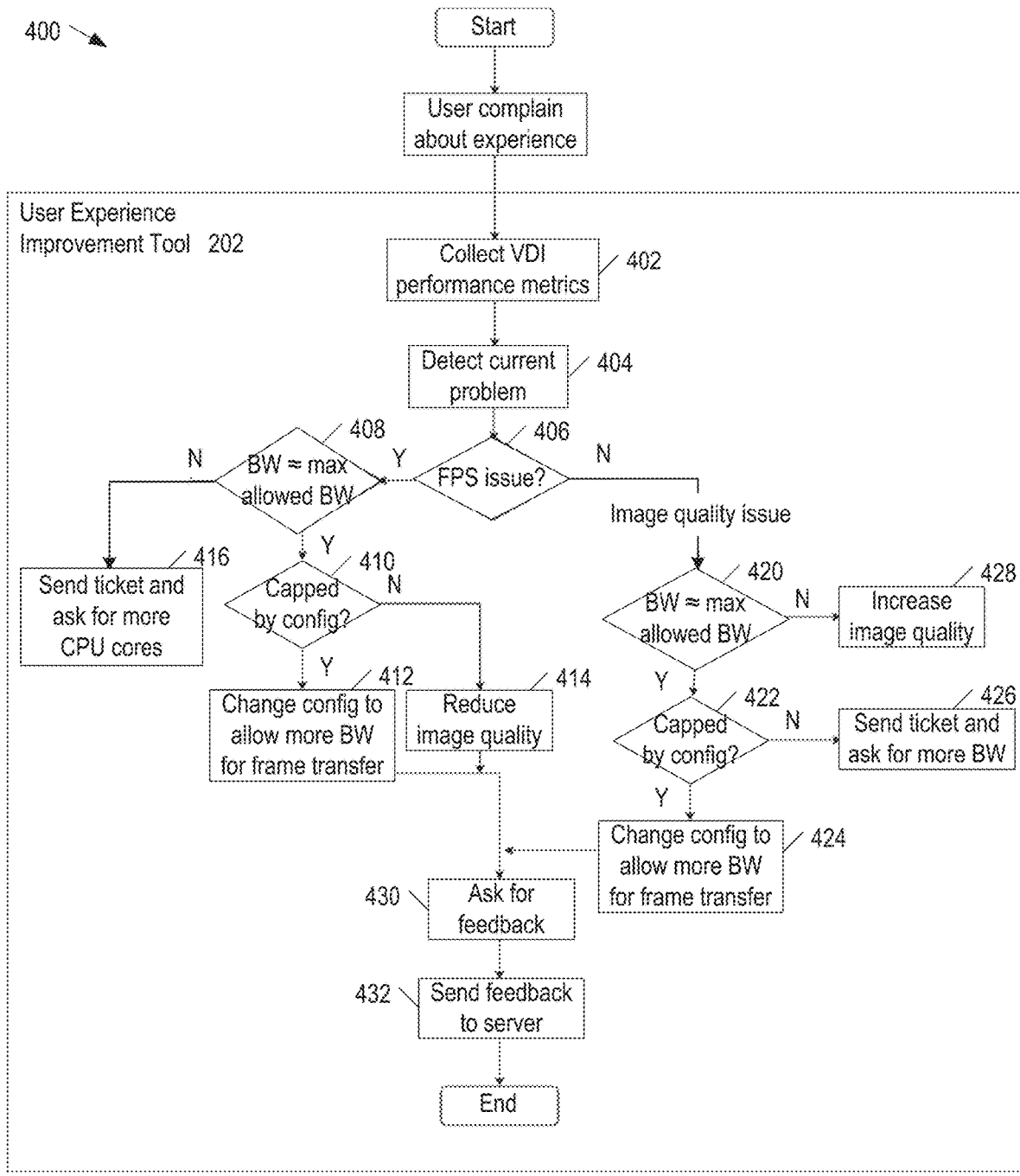
FIG. 4 is a block diagram illustrating a method for the user experience improvement tool of FIG. 2 to improve user experience in some examples of the present disclosure.

FIG. 4 is a block diagram illustrating a method 400 for the user experience improvement tool 202 (FIG. 2) to improve user experience in some examples of the present disclosure. Method 400 corresponds to blocks 304 to 310 in method 300 (FIG. 3). Method 400 may begin in block 402.

In block 402, in response to a user complaining of a poor user experience during a VDI session, the user experience improvement tool 202 collects the VDI performance metrics in the VDI session. Block 402 may be followed by block 404.

In block 404, the user experience improvement tool 202 detects a problem based on the VDI performance metrics. The problem may be low frame per second (FPS) of screen updates, low image quality of screen updates, high central processing unit (CPU) usage, or high network bandwidth consumption. Block 404 may be followed by block 406.

In block 406, the user experience improvement tool 202 determines if the FPS is low. If so, block 406 may be followed by 408. Otherwise the image quality is low and block 406 may be followed by block 420.

In block 408, the user experience improvement tool 202 determines if a bandwidth consumption for frame transfer of the user's virtual desktop is approaching a maximum allowed bandwidth for frame transfer set in the remote display protocol configuration for the virtual desktop. If so, block 408 may be followed by block 410. Otherwise CPU usage is high and block 408 may be followed by block 416. For example, the maximum allowed bandwidth for frame transfer is the Max Session Bandwidth setting for the remote display protocol.

In block 410, the user experience improvement tool 202 determines if the maximum allowed bandwidth for frame transfer is capped by the remote display protocol configuration for the virtual desktop. For example, the maximum allowed bandwidth may be capped by the Max Bandwidth Kbps Per Mega Pixel Slope setting for the remote desktop protocol. If so, block 410 may be followed by block 412. Otherwise block 410 may be followed by block 414.

In block 412, the user experience improvement tool 202 changes the remote display protocol configuration by increasing the maximum allowed bandwidth for frame transfer. For example, the user experience improvement tool 202 can change the Max Session Bandwidth setting for the remote display protocol. Block 412 may be followed by block 430.

In block 414, the user experience improvement tool 202 changes the remote display protocol configuration by reducing the image quality. For example, the user experience improvement tool 202 can reduce the image quality by changing the H264maxQP setting for the remote display protocol. Block 414 may be followed by block 430.

In block 416, the user experience improvement tool 202 sends a ticket to the system administrator to request for more physical processing resources (e.g., more CPU cores).

In block 420, the user experience improvement tool 202 determines if the bandwidth consumption for frame transfer of the user's virtual desktop is approaching the maximum allowed bandwidth for frame transfer set in the remote display protocol configuration for the virtual desktop. If so, block 420 may be followed by block 422. Otherwise block 420 may be followed by block 428.

In block 422, the user experience improvement tool 202 determines if the maximum allowed bandwidth is capped by the first remote display protocol configuration. For example, the maximum allowed bandwidth may be capped by the Max Bandwidth Kbps Per Mega Pixel Slope setting for the remote desktop protocol. If so, block 422 may be followed by block 424. Otherwise the network bandwidth consumption is high and block 422 may be followed by block 426.

In block 424, the user experience improvement tool 202 changes the remote display protocol configuration by increasing the maximum allowed bandwidth for frame transfer. For example, the user experience improvement tool 202 can change the Max Session Bandwidth setting for the remote display protocol. Block 424 may be followed by block 430.

In block 426, the user experience improvement tool 202 sends a ticket to the system administrator to request for more physical networking resources.

In block 428, the user experience improvement tool 202 changes the remote display protocol configuration by increasing the image quality. For example, the user experience improvement tool 202 can increase the image quality by changing the H264maxQP setting for the remote display protocol. Block 428 may be followed by block 430.

In block 430, the user experience improvement tool 202 asks feedback from the user after making changes to the remote display protocol configuration. Block 430 may be followed by block 432.

In block 432, the user experience improvement tool 202 sends the user feedback to AI server or cloud service 208 (FIG. 2).

Figure 5:
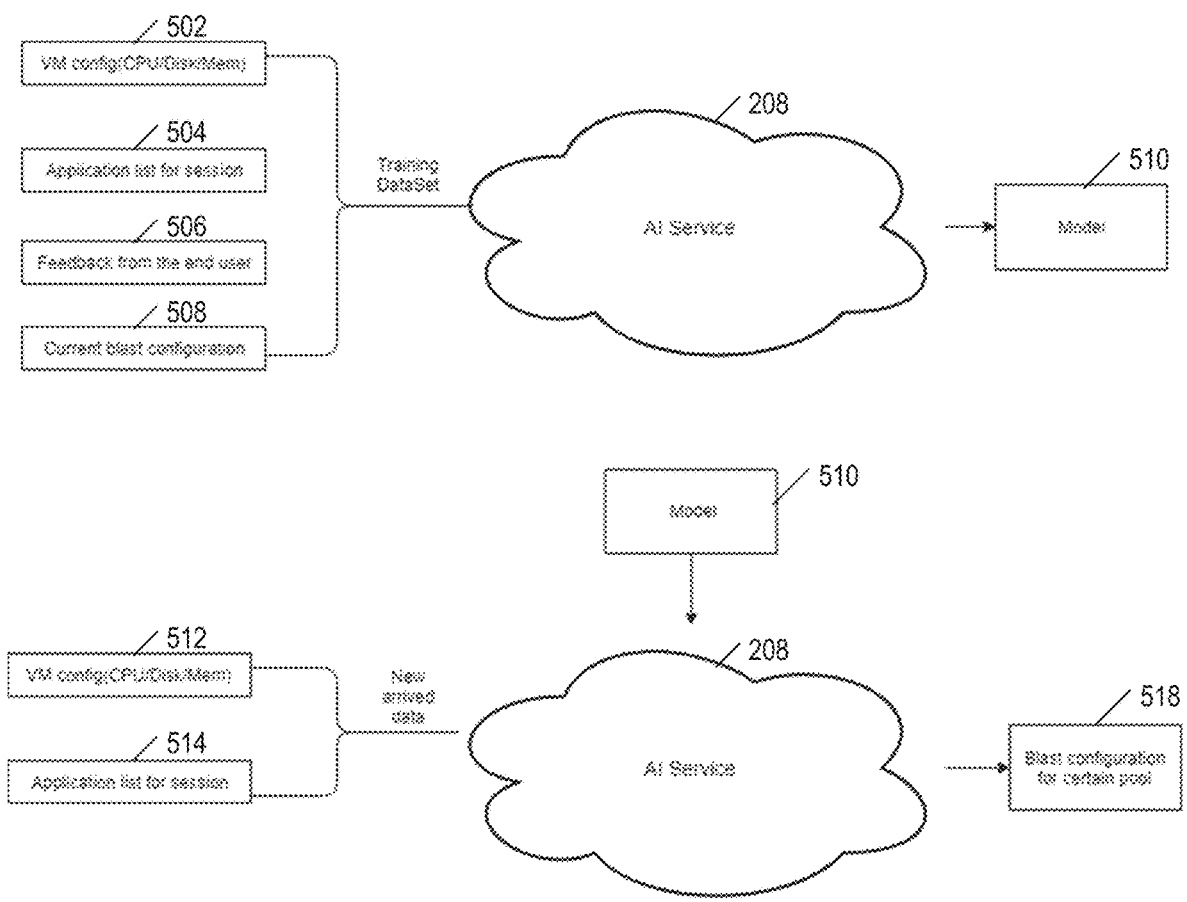
FIG. 5 is a block diagram illustrating how an artificial intelligence (AI) server or cloud service generates a remote desktop protocol configuration to improve user experience in some examples of the present disclosure.

FIG. 5 is a block diagram illustrating how AI server or cloud service 208 (FIG. 2) generates a remote desktop protocol configuration to improve user experience in some examples of the present disclosure. FIG. 5 corresponds to blocks 312 to 316 in method 300 (FIG. 3).

AI server or cloud service 208 receives training data sets each including a virtual machine configuration 502, an application list 504 of applications, a feedback 506 from the user, and the remote desktop protocol configuration 508 collected in a VDI session. AI server or cloud service 208 uses the training data sets to train a model 510. In some examples, model 510 is a classification model that uses Gradient boosting (GDBT) machine learning technique.

For a newly created virtual desktop pool 108 (FIG. 1), AI server or cloud service 208 receives its virtual machine configuration 512 and application list 514 of applications. AI server or cloud service 208 uses classification model 510 to generate the remote desktop protocol configuration 518 that provides good user experience.

Figure 6:
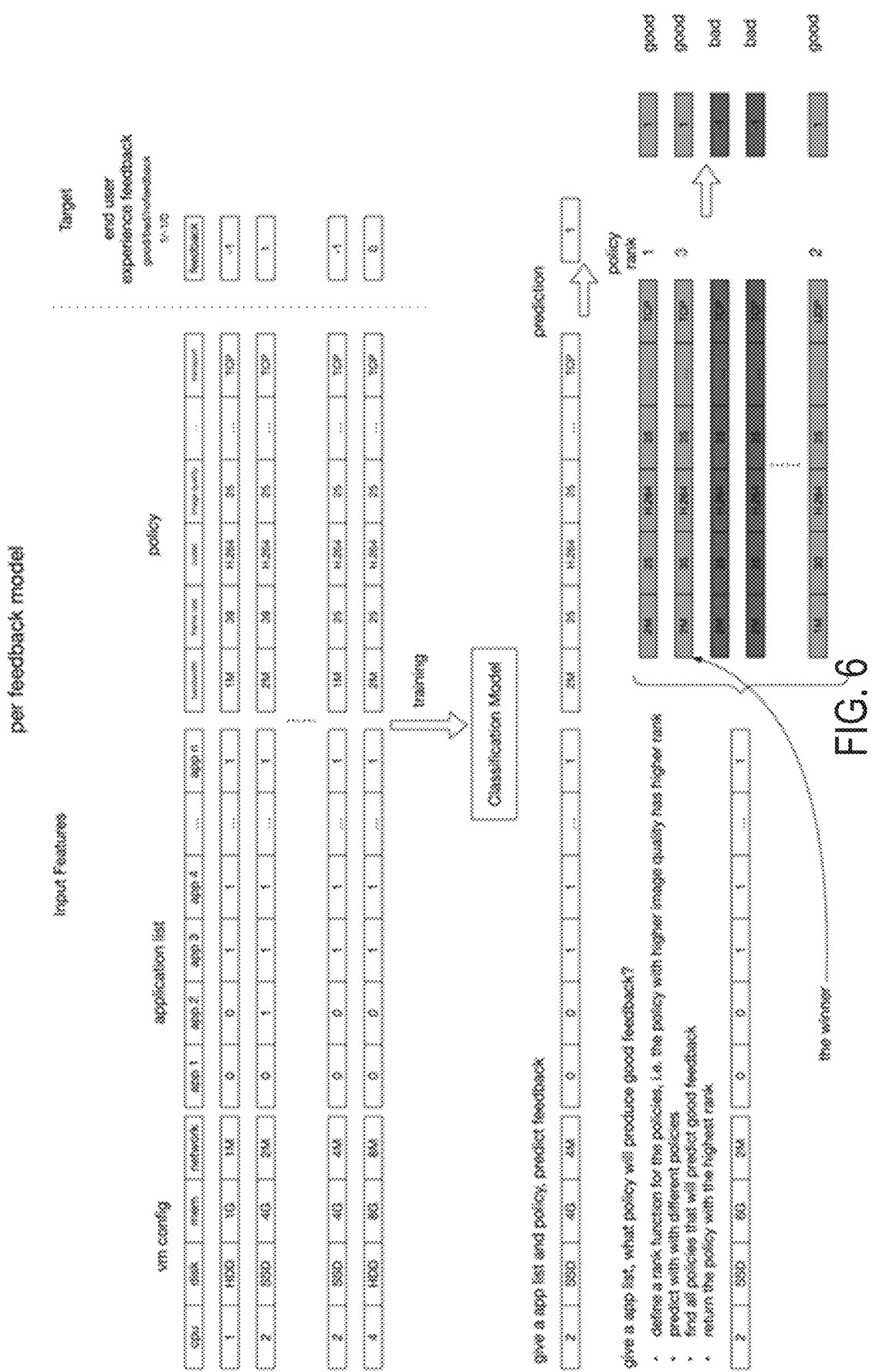
FIG. 6 is a block diagram illustrating the detail for a classification model of FIG. 5 in some examples of the present disclosure.

FIG. 6 is a block diagram illustrating the detail for classification model 510 (FIG. 5) in some examples of the present disclosure. As discussed above, each data set for a VDI session includes a virtual machine configuration, an application list, a remote desktop protocol configuration, and a user experience feedback. The virtual machine configuration includes the number of CPUs (e.g., CPU cores), the type of secondary memory, the size of primary memory, and the bandwidth of the network interface card. The application list indicates which of a number of applications are present, and the remote desktop protocol configuration includes policy settings such as the bandwidth, the frame rate, the codec, the image quality, and the transport protocol. The user experience feedback may be 1 for good, −1 for bad, and 0 for no feedback.

Given a virtual machine configuration and an application list for a newly created virtual desktop pool 108 (FIG. 1), AI server or cloud service 208 may apply a number of combinations of the settings in the remote desktop protocol configuration (policies) to classification model 510 to predict corresponding user experience feedbacks. AI server or cloud service 208 may use a ranking function to rank all the policies with good user experience feedback. The ranking function may rank the policies according by weighting certain settings in the remote desktop protocol configuration, such as the image quality and the frame rate. AI server or cloud service 208 may return the policy with the highest rank as the remote desktop protocol configuration for the newly created virtual desktop pool 108.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to improve virtual desktop infrastructure (VDI) user experience, comprising:
   providing a user access to a first virtual desktop executing a first set of applications and having a first virtual machine configuration;
   collecting VDI performance metrics associated with the first virtual desktop;
   detecting a problem from the VDI performance metrics;
   when the problem is caused by a first remote display protocol configuration on the first virtual desktop, automatically changing the first remote display protocol configuration to address the problem;
   collecting the user's feedback after changing the first remote display protocol configuration;
   training a model with training data including (1) the first virtual machine configuration of the first virtual desktop, (2) a first list of the first set of applications on the first virtual desktop, (3) the user's feedback, and (4) the first remote display protocol configuration;
   receiving (1) a second virtual machine configuration for a second virtual desktop and (2) a second list of a second set of applications on the second virtual desktop;
   based on (1) the second virtual machine configuration and (2) the second list of the second set of applications on the second virtual desktop, using the model to generate a second remote display protocol configuration for the second virtual desktop; and
   configuring the second virtual desktop to be accessed using the second remote display protocol configuration.

2. The method of claim 1, wherein:
   the model comprises a classification model; and
   the using the model to generate a second remote display protocol configuration comprises:
      predicting user feedbacks based on the second virtual machine configuration, the second list, and a plurality of remote display protocol configurations; and
      selecting one of the plurality of remote display protocol configurations having the highest predicted user feedback.

3. The method of claim 1, wherein:
   when (1) the problem is a low frame rate of screen updates for the first virtual desktop, (2) a bandwidth consumption for frame transfer of the first virtual desktop is approaching a maximum allowed bandwidth set in the first remote display protocol configuration, and (3) the maximum allowed bandwidth is capped by the first remote display protocol configuration, changing the first remote display protocol configuration comprises increasing the maximum allowed bandwidth; and
   when (1) the problem is the low frame rate, (2) the bandwidth consumption is approaching the maximum allowed bandwidth, and (3) the maximum allowed bandwidth is not capped by the first remote display protocol configuration, changing the first remote display protocol configuration comprises reducing an image quality of the screen updates in the first remote display protocol configuration.

4. The method of claim 1, wherein:
   when (1) the problem is a low image quality of screen updates for the first virtual desktop and (2) the bandwidth consumption of the first virtual desktop is not approaching the maximum allowed bandwidth, changing the first remote display protocol configuration comprises increasing an image quality of the screen updates; and when (1) the problem is the low image quality, (2) the bandwidth consumption is approaching the maximum allowed bandwidth, and (3) the maximum allowed bandwidth is capped by the first remote display protocol configuration, changing the first remote display protocol configuration comprises increasing the maximum allowed bandwidth.

5. The method of claim 1, further comprising, when the problem is caused by a first virtual machine configuration on the first virtual desktop, generating a request for more physical resources for the first virtual desktop.

6. The method of claim 5, wherein:
when (1) the problem is a low frame rate of screen updates for the first virtual desktop and (2) a bandwidth consumption for frame transfer of the first virtual desktop is not approaching a maximum allowed bandwidth set in the first remote display protocol configuration, generating the request for more physical resources comprises requesting more central processing unit (CPU) cores; and
when (1) the problem is a low image quality of the screen updates for the first virtual desktop, (2) the bandwidth consumption is approaching the maximum allowed bandwidth, and (3) the maximum allowed bandwidth is not capped by the first remote display protocol configuration, generating the request for more physical resources comprises requesting more physical networking resources.

7. The method of claim 1, wherein the collecting VDI performance metrics on the first virtual desktop for the user occurs in one session.

8. The method of claim 1, wherein the second virtual desktop is part of a pool of virtual desktops and configuring the second virtual desktop with the second remote display protocol configuration comprises configuring the pool of virtual desktop with the second remote display protocol configuration.

9. A non-transitory, computer-readable storage medium encoded with instructions executable by a processor to improve virtual desktop infrastructure (VDI) user experience, the instructions comprising:
providing a user access to a first virtual desktop executing a first set of applications and having a first virtual machine configuration;
collecting VDI performance metrics associated with the first virtual desktop;
detecting a problem from the VDI performance metrics;
when the problem is caused by a first remote display protocol configuration on the first virtual desktop, automatically changing the first remote display protocol configuration to address the problem;
collecting the user's feedback after changing the first remote display protocol configuration;
training a model with training data including (1) the first virtual machine configuration of the first virtual desktop, (2) a first list of the first set of applications on the first virtual desktop, (3) the user's feedback, and (4) the first remote display protocol configuration;
receiving (1) a second virtual machine configuration for a second virtual desktop and (2) a second list of a second set of applications on the second virtual desktop;
based on (1) the second virtual machine configuration and (2) the second list of the second set of applications on the second virtual desktop, using the model to generate a second remote display protocol configuration for the second virtual desktop; and
configuring the second virtual desktop to be accessed using the second remote display protocol configuration.

10. The computer-readable storage medium of claim 9, wherein:
the model comprises a classification model; and
the using the model to generate a second remote display protocol configuration comprises:
predicting user feedbacks based on the second virtual machine configuration, the second list, and a plurality of remote display protocol configurations; and
selecting one of the plurality of remote display protocol configurations having the highest predicted user feedback.

11. The computer-readable storage medium of claim 9, wherein:
when (1) the problem is a low frame rate of screen updates for the first virtual desktop, (2) a bandwidth consumption for frame transfer of the first virtual desktop is approaching a maximum allowed bandwidth set in the first remote display protocol configuration, and (3) the maximum allowed bandwidth is capped by the first remote display protocol configuration, changing the first remote display protocol configuration comprises increasing the maximum allowed bandwidth; and
when (1) the problem is the low frame rate, (2) the bandwidth consumption is approaching the maximum allowed bandwidth, and (3) the maximum allowed bandwidth is not capped by the first remote display protocol configuration, changing the first remote display protocol configuration comprises reducing an image quality of the screen updates in the first remote display protocol configuration.

12. The computer-readable storage medium of claim 9, wherein:
when (1) the problem is a low image quality of screen updates for the first virtual desktop and (2) the bandwidth consumption of the first virtual desktop is not approaching the maximum allowed bandwidth, changing the first remote display protocol configuration comprises increasing an image quality of the screen updates; and
when (1) the problem is the low image quality, (2) the bandwidth consumption is approaching the maximum allowed bandwidth, and (3) the maximum allowed bandwidth is capped by the first remote display protocol configuration, changing the first remote display protocol configuration comprises increasing the maximum allowed bandwidth.

13. The computer-readable storage medium of claim 9, wherein the instructions further comprise, when the problem is caused by a first virtual machine configuration on the first virtual desktop, generating a request for more physical resources for the first virtual desktop.

14. The computer-readable storage medium of claim 13, wherein:
when (1) the problem is a low frame rate of screen updates for the first virtual desktop and (2) a bandwidth consumption for frame transfer of the first virtual desktop is not approaching a maximum allowed bandwidth set in the first remote display protocol configuration, generating the request for more physical resources comprises requesting more central processing unit (CPU) cores; and
when (1) the problem is a low image quality of the screen updates for the first virtual desktop, (2) the bandwidth consumption is approaching the maximum allowed bandwidth, and (3) the maximum allowed bandwidth is not capped by the first remote display protocol configuration, generating the request for more physical resources comprises requesting more physical networking resources.

15. The computer-readable storage medium of claim 9, wherein the collecting VDI performance metrics on the first virtual desktop for the user occurs in one session.

16. The computer-readable storage medium of claim 9, wherein the second virtual desktop is part of a pool of virtual desktops and configuring the second virtual desktop with the second remote display protocol configuration comprises configuring the pool of virtual desktop with the second remote display protocol configuration.

17. A system, comprising:
host computers comprising hypervisors running virtual machines implementing virtual desktops to users;
a user experience improvement tool being configured to:
provide a user access to a first virtual desktop executing a first set of applications and a first virtual machine configuration;
collect VDI performance metrics associated with the first virtual desktop;
detect a problem from the VDI performance metrics;
when the problem is caused by a first remote display protocol configuration on the first virtual desktop, automatically change the first remote display protocol configuration to address the problem;
collect the user's feedback after changing the first remote display protocol configuration; and
send the user's feedback to a server;
the server being configured to:
train a model with training data including (1) the first virtual machine configuration, (2) a first list of the first set of applications on the first virtual desktop, (3) the user's feedback, and (4) the first remote display protocol configuration;
receive (1) a second virtual machine configuration for a second virtual desktop and (2) a second list of a second set of applications on the second virtual desktop;
based on (1) the second virtual machine configuration and (2) the second list of the second set of applications on the second virtual desktop, use the model to generate a second remote display protocol configuration for the second virtual desktop; and
send the second virtual remote display protocol configuration to a connection server; and
the connection server being configured to configure the second virtual desktop to be accessed using the second remote display protocol configuration.

18. The system of claim 17, wherein:
the model comprises a classification model; and
the server being configured to use the model to generate the second remote display protocol configuration by:
predicting user feedbacks based on the second virtual machine configuration, the second list, and a plurality of remote display protocol configurations; and
selecting one of the plurality of remote display protocol configurations having the highest predicted user feedback.

19. The system of claim 17, wherein:
when (1) the problem is a low frame rate of screen updates for the first virtual desktop, (2) a bandwidth consumption of the first virtual desktop is approaching a maximum allowed bandwidth set in the first remote display protocol configuration, and (3) the maximum allowed bandwidth is capped by the first remote display protocol configuration, change the first remote display protocol configuration comprises increasing the maximum allowed bandwidth; and
when (1) the problem is the low frame rate, (2) the bandwidth consumption is approaching the maximum allowed bandwidth, and (3) the maximum allowed bandwidth is not capped by the first remote display protocol configuration, change the first remote display protocol configuration comprises reducing an image quality of the screen updates in the first remote display protocol configuration.

20. The system of claim 17, wherein:
when (1) the problem is a low image quality of screen updates for the first virtual desktop and (2) the bandwidth consumption of the first virtual desktop is not approaching the maximum allowed bandwidth, changing the first remote display protocol configuration comprises increasing an image quality of the screen updates; and
when (1) the problem is the low image quality, (2) the bandwidth consumption is approaching the maximum allowed bandwidth, and (3) the maximum allowed bandwidth is capped by the first remote display protocol configuration, changing the first remote display protocol configuration comprises increasing the maximum allowed bandwidth.

21. The system of claim 17, wherein the user experience improvement tool is further configured to, when the problem is caused by a first virtual machine configuration on the first virtual desktop, generate a request for more physical resources for the first virtual desktop.

22. The system of claim 21, wherein:
when (1) the problem is a low frame rate of screen updates for the first virtual desktop and (2) a bandwidth consumption of the first virtual desktop is not approaching a maximum allowed bandwidth set in the first remote display protocol configuration, generate the request for more physical resources comprises requesting more central processing unit (CPU) cores; and
when (1) the problem is a low image quality of the screen updates for the first virtual desktop, (2) the bandwidth consumption is approaching the maximum allowed bandwidth, and (3) the maximum allowed bandwidth is not capped by the first remote display protocol configuration, generate the request for more physical resources comprises requesting more physical networking resources.

23. The system of claim 17, wherein the user experience improvement tool being configured to collect the VDI performance metrics on the first virtual desktop for the user in one session.

24. The system of claim 17, wherein the second virtual desktop is part of a pool of virtual desktops and configuring the second virtual desktop with the second remote display protocol configuration comprises configuring the pool of virtual desktops with the second remote display protocol configuration.

* * * * *